United States Patent Office 3,066,011
Patented Nov. 27, 1962

3,066,011
PROCESS FOR THE PRODUCTION OF HYDROXYL-
AMMONIUM ACID SULFATE
Robert J. Agne, St. Louis, Mo., assignor to Commercial
Solvents Corporation, New York, N.Y., a corporation
of Maryland
No Drawing. Filed Aug. 28, 1959, Ser. No. 836,594
4 Claims. (Cl. 23—117)

My invention relates to the production of hydroxylammonium acid sulfate and more specifically to an improved process for the production of hydroxylammonium acid sulfate by the interaction of sulfuric acid, nitromethane, and primary nitroalkanes containing more than two carbon atoms in the presence of traces of iron.

Hydroxylammonium acid sulfate is often prepared by the interaction of sulfuric acid and primary nitroalkanes. The production of hydroxylammonium acid sulfate from primary nitroalkanes by the use of sulfuric acid is disclosed in U.S. Patent Nos. 2,113,812; 2,113,813; and 2,113,814, issued to S. B. Lippincott. In utilizing the procedures of the above-named patents, 100% conversion of one mole of primary nitroalkane to one mole of hydroxylammonium acid sulfate is theoretically possible. However, this theoretical yield has not been obtained in practice. Not only are yields produced by these procedures low, but the products are generally of poor color and purity.

The poor color, lack of purity and low yields are believed to be partially caused by the adverse effect of traces of iron in the reaction mixture. The presence of iron, even in concentrations as low as 10 p.p.m., is believed to result in the decomposition of hydroxylammonium acid sulfate, said decomposition rate increasing as the chain length of the primary nitroalkanes used in the reaction increases. However, because of the possibilities of combustion and explosion arising from the handling of large amounts of nitromethane which is the primary nitroalkane with the shortest carbon chain length, its use alone is not practical.

The presence of iron in the reaction mixture can originate from many sources. The most likely of these sources is, however, either the primary nitroalkane or the sulfuric acid, or both. Sulfuric acid and the primary nitroalkanes both have corrosive effect on ferrous metal surfaces. Therefore, amounts of iron sufficient to adversely affect the yield of hydroxylammonium acid sulfate can easily be picked up by these materials when stored or handled in iron or steel containers. Therefore, it would be desirable to eliminate all sources of iron from the reaction product. The removal of quantities of iron as low as 10 p.p.m., however, is uneconomical because of the multitude of opportunities for iron contamination of the reactants during production, storage and handling.

I have now discovered a process whereby improved yields of substantially pure, crystalline hydroxylammonium acid sulfate of improved color quality can be economically and safely obtained from the interaction of primary alkanes with sulfuric acid in the presence of traces of iron without the need of special equipment and handling procedures. My process also provides a safe and convenient use for nitromethane.

My invention consists essentially of interacting a mixture of nitromethane and a 1-nitroalkane containing 2–4 carbon atoms, inclusive, said mixture containing 10–90% by weight of the said 1-nitroalkane based on the weight of the mixture with an 85–99% concentration of sulfuric acid. I prefer 70–80% of the said 1-nittroalkane by weight and a sulfuric acid concentration of 90–98%.

In carrying out my invention, the procedure described in the above-named Lippincott patents can be utilized. In utilizing the above-named procedures, I can use molar ratios of nitroalkanes to acid of from about 1.5:1 to 1:1 and temperatures of about 100–150° C. However, for optimum yields and purity, I prefer mole ratios of nitroalkanes to acid of from about 1.2:1 to about 1.1:1 and temperatures of from about 130–140° C.

The following examples will serve to illustrate my invention. I do not intend to be limited to the components, temperatures, proportions, etc., but rather it is intended that all equivalents obvious to those skilled in the art be included within the scope of my invention.

*Example I*

A reaction mixture comprising 301 g. of 95.4% purity 1-nitropropane, 74.4 g. of 96.2% purity nitromethane, 411.6 g. of 100% sulfuric acid containing 41 p.p.m. of iron and 53 g. of water was refluxed for approximately 4 hours at temperatures ranging from about 130–140° C. The refluxed material was then allowed to cool for approximately 14 hours to room temperature, in which time it separated into two layers, the bottom of which contained hydroxylammonium acid sulfate. The top layer was then separated from the bottom layer and the following results were secured.

| Product | Conversion based on 1-nitropropane and nitromethane introduced, percent | Purity, percent | Color |
|---|---|---|---|
| Hydroxylammonium acid sulfate. | 78.9 | 90.15 | Pale yellow. |

*Example II*

A reaction mixture comprising 353 g. of 95.4% purity 1-nitropropane, 39 g. of 96.2% purity nitromethane, 411.6 g. of 100% sulfuric acid containing 41 p.p.m. of iron and 62 g. of water was treated as described in Example I. The following results were secured.

| Product | Conversion based on 1-nitropropane and nitromethane introduced, percent | Purity, percent | Color |
|---|---|---|---|
| Hydroxylammonium acid sulfate. | 78.0 | 88.98 | Pale yellow. |

The effectiveness of my invention is demonstrated by comparing the results shown in Example I and Example II with the results shown in Example III, where no nitromethane was added to the reaction mixture.

*Example III*

A reaction mixture comprising 411 g. of 95.4% purity 1-nitropropane, 411.6 g. of 100% sulfuric acid containing 41 p.p.m. of iron, and 71.4 g. of water was treated as described in Example I. The following results were secured.

| Product | Conversion based on 1-nitropropane and nitromethane introduced, percent | Purity, percent | Color |
|---|---|---|---|
| Hydroxylammonium acid sulfate. | 75.7 | 86.69 | Light tan to dark reddish-brown. |

Now having described my invention, what I claim is:
1. In a process for the production of hydroxylammonum acid sulfate in the presence of traces of iron by the interaction of sulfuric acid and primary nitroalkanes at a molar ratio of nitroalkanes to acid of from about 1:1 to 1.5:1 and at temperatures ranging from about 100–150° C., the improvement which comprises interacting a mixture of nitromethane and a 1-nitroalkane containing 2–4 carbon atoms inclusive, said mixture containing 10–90% by weight of the 1-nitroalkane, based on the weight of the mixture, with 85–99% sulfuric acid.

2. The process of claim 1 wherein the concentration of the acid is 90–98%.

3. The process of claim 1 wherein the said mixture contains 70–80% 1-nitroalkane by weight.

4. The improved process of producing hydroxylammonium acid sulfate in a reaction mixture containing traces of iron which comprises reacting a mixture of 1-nitropropane and nitromethane containing about 70–80% by weight of 1-nitropropane, with about 90–98% concentrated sulfuric acid in a mole ratio of nitroalkanes to acid from about 1.2:1 to about 1.1:1 and at temperatures of about 130–140° C.

References Cited in the file of this patent

UNITED STATES PATENTS

| | | |
|---|---|---|
| 2,113,812 | Lippincott | Apr. 12, 1938 |
| 2,368,072 | Tryon | Jan. 23, 1945 |